United States Patent
Boxwala et al.

(10) Patent No.: US 12,299,040 B2
(45) Date of Patent: May 13, 2025

(54) SYSTEM FOR GENERATING MACHINE LEARNING-BASED ASSOCIATIONS FOR ELECTRONIC DATA RECORDS

(71) Applicant: Elimu Informatics, Inc., El Cerrito, CA (US)

(72) Inventors: Aziz A. Boxwala, La Jolla, CA (US); Seemeen S. Karimi, La Jolla, CA (US)

(73) Assignee: ELIMU INFORMATICS, INC., El Cerrito, CA (US)

( * ) Notice: Subject to any disclaimer, the term of this patent is extended or adjusted under 35 U.S.C. 154(b) by 13 days.

(21) Appl. No.: 18/198,900

(22) Filed: May 18, 2023

(65) Prior Publication Data
US 2023/0376535 A1      Nov. 23, 2023

Related U.S. Application Data

(60) Provisional application No. 63/343,366, filed on May 18, 2022.

(51) Int. Cl.
| | | |
|---|---|---|
| G06F 17/00 | (2019.01) | |
| G06F 7/00 | (2006.01) | |
| G06F 16/28 | (2019.01) | |
| G06F 16/901 | (2019.01) | |

(52) U.S. Cl.
CPC ........ G06F 16/9024 (2019.01); G06F 16/284 (2019.01)

(58) Field of Classification Search
CPC .......................... G06F 16/9024; G06F 16/284
USPC ............................................................ 707/798
See application file for complete search history.

(56) References Cited

U.S. PATENT DOCUMENTS

| | | | |
|---|---|---|---|
| 9,418,128 B2* | 8/2016 | Li | G06F 16/951 |
| 2015/0363476 A1* | 12/2015 | Li | G06F 16/36 |
| | | | 707/736 |
| 2017/0293696 A1* | 10/2017 | Bendersky | G06N 5/022 |
| 2018/0276278 A1* | 9/2018 | Cagan | G06F 16/9024 |
| 2019/0108285 A1* | 4/2019 | Stillwell, Jr. | G06F 16/951 |

* cited by examiner

*Primary Examiner* — Pavan Mamillapalli
(74) *Attorney, Agent, or Firm* — Moore & Van Allen PLLC

(57) ABSTRACT

A system is provided for generating machine learning-based associations for electronic data records. In particular, the system may access one or more relevant databases and use machine learning algorithms to automatically generate associations between certain concepts based on the contents and/or hierarchical structures of such databases. The system may further intelligently calculate weight values for each of the associations that may represent the strength of the relatedness or relevance between concepts. Once the associations are generated, the system may, in response to a query for information related to a certain concept, generate and provide a context-relevant view of the concept to the user. In this way, the system provides an efficient way to correlate information within electronic data records.

20 Claims, 4 Drawing Sheets

400

RECEIVE, FROM A USER APPLICATION, A SEARCH QUERY ASSOCIATED WITH AN ELECTRONIC DATA RECORD, WHEREIN THE SEARCH QUERY COMPRISES A SOURCE NODE AND A DATA RECORD IDENTIFIER ASSOCIATED WITH THE ELECTRONIC DATA RECORD
401

RETRIEVE ONE OR MORE SOURCE UNIQUE IDENTIFIERS ASSOCIATED WITH A SOURCE IDENTIFIER CODE
402

IDENTIFY, USING THE NODE ASSOCIATIONS DATABASE, ONE OR MORE TARGET UNIQUE IDENTIFIERS ASSOCIATED WITH THE ONE OR MORE SOURCE UNIQUE IDENTIFIERS
403

BASED ON THE ONE OR MORE TARGET UNIQUE IDENTIFIERS, IDENTIFY ONE OR MORE TARGET IDENTIFIER CODES
404

COMPUTE WEIGHTS OF ONE OR MORE ASSOCIATIONS CORRESPONDING WITH THE SOURCE IDENTIFIER CODE
405

BASED ON THE SOURCE IDENTIFIER CODE AND THE ONE OR MORE TARGET IDENTIFIER CODES, RETRIEVE AT LEAST A SUBSET OF THE ELECTRONIC DATA RECORD
406

PRESENT, ON A DISPLAY OF A USER COMPUTING SYSTEM, THE AT LEAST A SUBSET OF THE ELECTRONIC DATA RECORD AND THE WEIGHTS OF THE ONE OR MORE ASSOCIATIONS
407

FIG. 4

SYSTEM FOR GENERATING MACHINE LEARNING-BASED ASSOCIATIONS FOR ELECTRONIC DATA RECORDS

CROSS-REFERENCE TO RELATED APPLICATIONS

This application claims the benefit of priority from U.S. Provisional Patent Application No. 63/343,366, filed on May 18, 2022, and entitled "SYSTEM FOR GENERATING MACHINE LEARNING-BASED ASSOCIATIONS FOR ELECTRONIC DATA RECORDS," the contents of which are hereby incorporated by reference in its entirety.

FIELD OF THE INVENTION

The present disclosure embraces a system for generating machine learning-based associations for electronic data records.

BACKGROUND

The volume of information within large electronic data records may pose number of usability challenges. For instance, manually searching the data record for relevant information can be a time-intensive process for a user. Furthermore, as data records grow larger, it may become increasingly likely that the user may miss relevant information. Accordingly, there is a need for an efficient way to generate associations with data records and process data queries.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for generating machine learning-based associations for electronic data records. In particular, the system may access one or more relevant databases and use machine learning algorithms to automatically generate associations between certain concepts based on the contents and/or hierarchical structures of such databases, where the one or more databases may include an associations database and/or a hierarchical relationship database. The system may further intelligently calculate weight values for each of the associations that may represent the strength of the relatedness or relevance between concepts. Once the associations are generated, the system may, in response to a query for information related to a certain concept, generate and provide a context-relevant view of electronic data related to the concept to the user. In this way, the system provides an efficient way to correlate information within electronic data records.

According, embodiments of the present disclosure provide a system for generating machine learning-based associations for electronic data records, the system comprising a processing device; and a non-transitory storage device containing instructions when executed by the processing device, causes the processing device to perform the steps of retrieving node data associated with one or more nodes from one or more external databases; identifying, using a machine learning algorithm, the one or more nodes within the node data; generating one or more node associations between the one or more nodes within the node data; storing the one or more nodes and the one or more node associations in a node associations database, wherein each of the one or more nodes is assigned a concept unique identifier; receiving, from a user application of a user computing device, a search query associated with an electronic data record, wherein the search query comprises a source node, wherein the source node is associated with a source identifier code; identifying, using the node associations database, a source unique identifier associated with the source identifier code; identifying one or more target unique identifiers associated with the source unique identifier, wherein each target node identifier is associated with one or more target nodes; based on the source identifier code and the one or more target identifier codes, retrieving at least a subset of the electronic data record; and presenting the at least a subset of the electronic data record on a display device of the user computing device, the at least a subset of the electronic data record comprising the one or more target nodes related to the source node.

In some embodiments, generating the one or more node associations comprises for each node pair within the node data, computing a normalized frequency of detected instances of the node pair within a data entry of a reference database; and assigning a weight value for an association between the node pair based on the normalized frequency.

In some embodiments, assigning the weight value comprises increasing the weight value based on detecting a higher normalized frequency of the node pair.

In some embodiments, generating the one or more node associations comprises discarding the association between the node pair based on detecting that the weight value has dropped below a predetermined threshold.

In some embodiments, generating the one or more node associations comprises accessing a hierarchical database associated with the source node; and generating associations between the source node and one or more nodes within a hierarchical structure associated with the source node.

In some embodiments, presenting the at least a subset of the electronic data comprises presenting a ranked list of the one or more target nodes related to the source node, wherein the one or more target nodes are ranked according to the association weights between the one or more target nodes and the source node.

In some embodiments, the node associations database is a relational database.

In some embodiments, the node associations database is a graph database, wherein the source node and the one or more target nodes are stored as vertices, and the one or more associations are stored as edges.

Embodiments of the present disclosure also provide a computer program product for generating machine learning-based associations for electronic data records, the computer program product comprising a non-transitory computer-readable medium comprising code causing an apparatus to perform the steps of retrieving node data associated with one or more nodes from one or more external databases; identifying, using a machine learning algorithm, the one or more nodes within the node data; generating one or more node associations between the one or more nodes within the node data; storing the one or more nodes and the one or more node associations in a node associations database, wherein each of the one or more nodes is assigned a concept unique identifier; receiving, from a user application of a user computing device, a search query associated with an electronic data record, wherein the search query comprises a source node, wherein the source node is associated with a source identifier code; identifying, using the node associations database, a source unique identifier associated with the source identifier code; identifying one or more target unique identifiers associated with the source unique identifier, wherein each target node identifier is associated with one or more target nodes; based on the source identifier code and the one or more target identifier codes, retrieving at least a subset of the electronic data record; and presenting the at least a subset of the electronic data record on a display device of the user computing device, the at least a subset of the electronic data record comprising the one or more target nodes related to the source node.

In some embodiments, generating the one or more node associations comprises for each node pair within the node data, computing a normalized frequency of detected instances of the node pair within a data entry of a reference database; and assigning a weight value for an association between the node pair based on the normalized frequency.

In some embodiments, assigning the weight value comprises increasing the weight value based on detecting a higher normalized frequency of the node pair.

In some embodiments, generating the one or more node associations comprises discarding the association between the node pair based on detecting that the weight value has dropped below a predetermined threshold.

In some embodiments, generating the one or more node associations comprises accessing a hierarchical database associated with the source node; and generating associations between the source node and one or more nodes within a hierarchical structure associated with the source node.

In some embodiments, presenting the at least a subset of the electronic data comprises presenting a ranked list of the one or more target nodes related to the source node, wherein the one or more target nodes are ranked according to the association weights between the one or more target nodes and the source node.

Embodiments of the present disclosure also provide a computer-implemented method for generating machine learning-based associations for electronic data records, the computer-implemented method comprising retrieving node data associated with one or more nodes from one or more external databases; identifying, using a machine learning algorithm, the one or more nodes within the node data; generating one or more node associations between the one or more nodes within the node data; storing the one or more nodes and the one or more node associations in a node associations database, wherein each of the one or more nodes is assigned a concept unique identifier; receiving, from a user application of a user computing device, a search query associated with an electronic data record, wherein the search query comprises a source node, wherein the source node is associated with a source identifier code; identifying, using the node associations database, a source unique identifier associated with the source identifier code; identifying one or more target unique identifiers associated with the source unique identifier, wherein each target node identifier is associated with one or more target nodes; based on the source identifier code and the one or more target identifier codes, retrieving at least a subset of the electronic data record; and presenting the at least a subset of the electronic data record on a display device of the user computing device, the at least a subset of the electronic data record comprising the one or more target nodes related to the source node.

In some embodiments, generating the one or more node associations comprises for each node pair within the node data, computing a normalized frequency of detected instances of the node pair within a data entry of a reference database; and assigning a weight value for an association between the node pair based on the normalized frequency.

In some embodiments, assigning the weight value comprises increasing the weight value based on detecting a higher normalized frequency of the node pair.

In some embodiments, generating the one or more node associations comprises discarding the association between the node pair based on detecting that the weight value has dropped below a predetermined threshold.

In some embodiments, generating the one or more node associations comprises accessing a hierarchical database associated with the source node; and generating associations between the source node and one or more nodes within a hierarchical structure associated with the source node.

In some embodiments, presenting the at least a subset of the electronic data comprises presenting a ranked list of the one or more target nodes related to the source node, wherein the one or more target nodes are ranked according to the association weights between the one or more target nodes and the source node The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
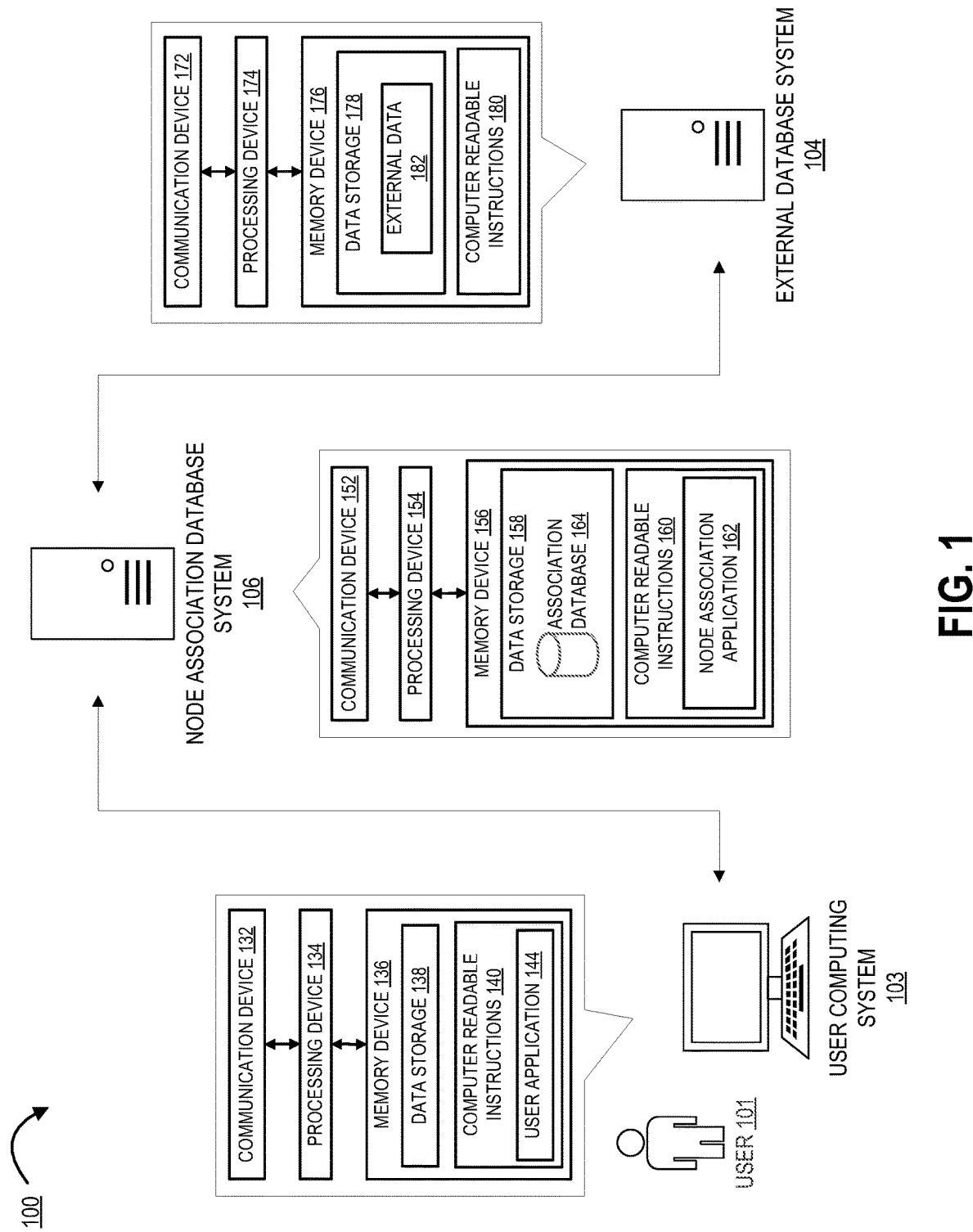
Figure 2:
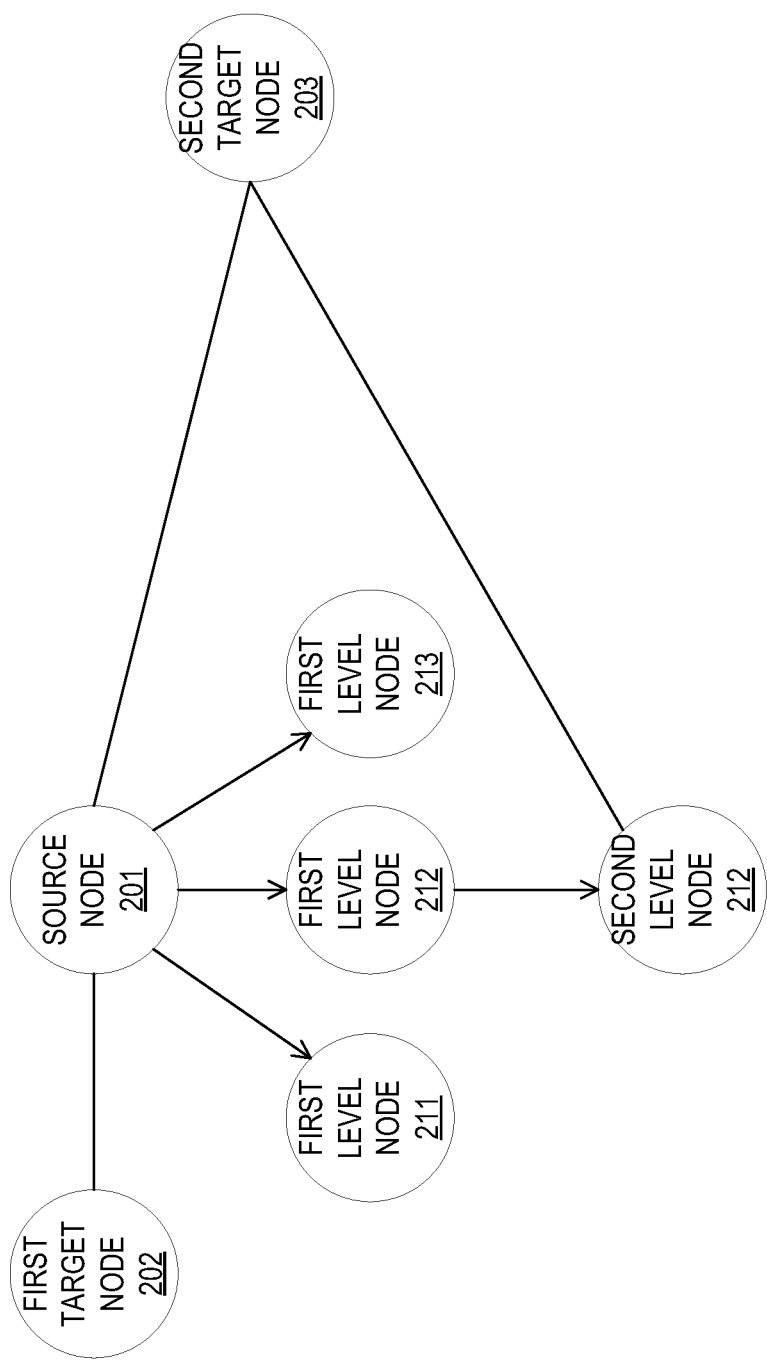
Figure 3:
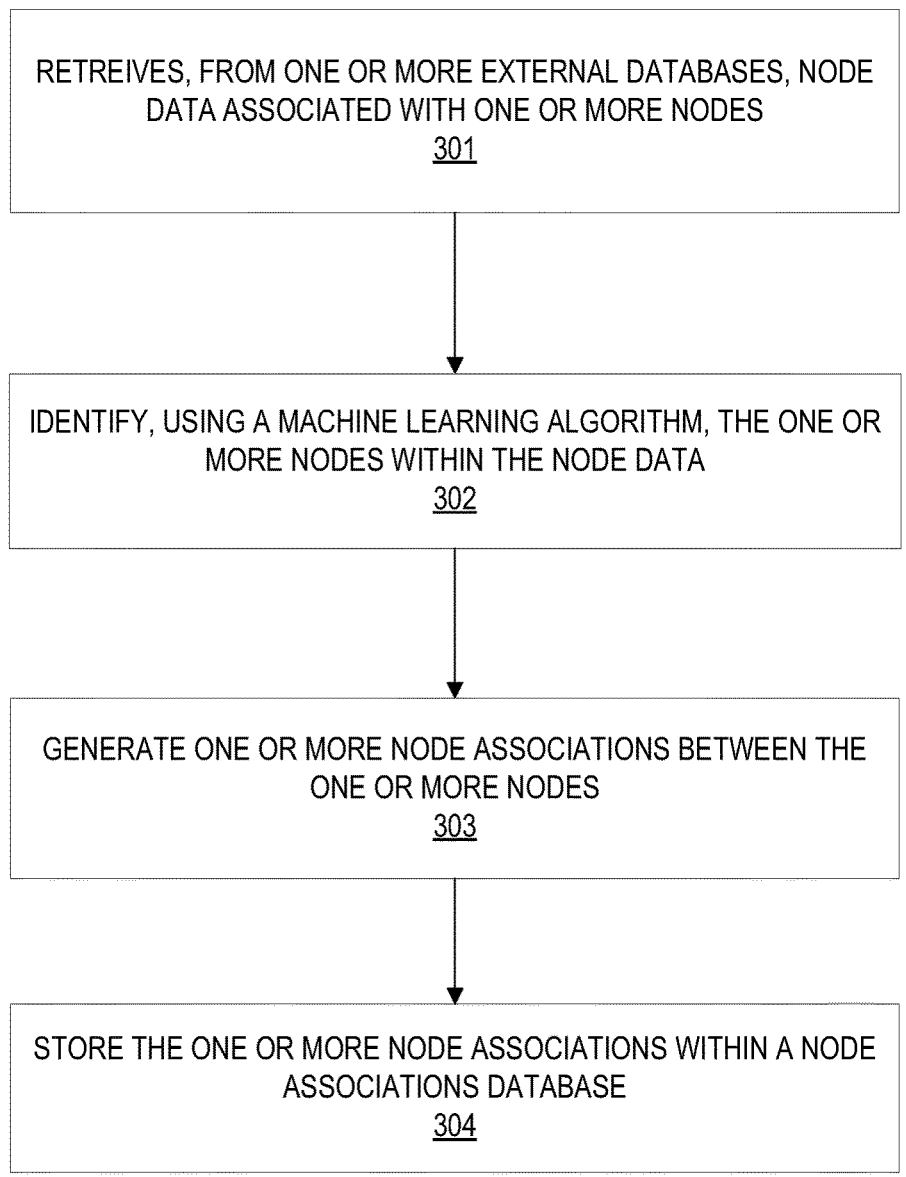

Having thus described embodiments of the invention in general terms, reference will now be made to the accompanying drawings, wherein:

FIG. 1 illustrates an operating environment for the intelligent association generation system, in accordance with some embodiments of the present disclosure;

FIG. 2 illustrates a diagram showing an exemplary association between nodes, in accordance with some embodiments of the present disclosure;

FIG. 3 illustrates a process flow for generating a node associations database using machine learning, in accordance with some embodiments of the present disclosure; and FIG. 4 illustrates a process flow for receiving and responding to search queries for relevant data within an electronic data record, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Natural language processing" or "NLP" as used herein may refer to the set of artificial intelligence-based processes used by a computing system to process and analyze data containing natural language information. In this regard, NLP may include processes to understand and generate natural language data.

The system as disclosed herein provides a way to generate context-relevant views of electronic data records, where each electronic data record may comprise data related to one or more concepts (which may also be referred to herein as "nodes"). The system may use machine learning algorithms to pull data from one or more databases that are related to the concepts found within the data records. Based on the information pulled from the databases, the system may automatically generate associations or links between the concepts, where the associations may be stored within an associations database. In some embodiments, the associations database may be a Structured Query Language ("SQL") database, though it is within the scope of the disclosure for the associations database to be implemented as a graph database in which the concepts may be stored as vertices and the associations may be stored as relationships, where the vertices and/or relationships may be associated with one or more properties, or any other type of database. Each association may be assigned a weight which represents the strength of the association between two concepts. In this regard, the weight may be computed based at least in part on the information found within the one or more databases from which the initial data was pulled. For instance, two concepts may be assigned higher weights based on the frequency at which the concepts are found within the one or more databases (e.g., higher frequencies result in higher weight values).

In some embodiments, once the association database is constructed, the system may receive search queries from a user application for related entries based on a concept inputted by the user. In other embodiments, the system may automatically search for related entries based on certain triggers (e.g., the user launching an app associated with a core concept, such as "anemia"). The system may, based on the mapped associations within the association database, populate a graphical interface (e.g., on the display of a user computing system) with the various entries that are related to the inputted concept. In some embodiments, the entries may be presented based on the weights of their associations with the inputted concept and/or the categories to which the entries belong. In this way, the system may automatically and efficiently provide the most relevant entries associated with a concept.

An exemplary use case is provided for illustrative purposes. It should be understood that the following use case is not intended to restrict the scope of the disclosure provided herein. In one embodiment, the electronic data records may be electronic health records ("EHR") or electronic medical records ("EMR"). Accordingly, the system may begin the process of generating an association database for concepts that may be found in EMR's. To provide an example of such concepts, the disease anemia may be associated with various other concepts, which may include pernicious anemia (a type or classification of anemia), hemoglobin level (a relevant metric for assessing anemia), iron capsule (a treatment for anemia), and the like. Thus, it may be advantageous for the system to expediently provide the user (e.g., a physician who may be treating a patient for anemia) with a context-relevant view of the various concepts related to anemia. To this end, "anemia" may be designated as a "source concept" whereas "hemoglobin level" and the like may be designated as "target concepts" that relate to the source concept. Furthermore, each concept and/or association may be classified and/or tagged within the association database according to their types. For instance, "anemia" may be tagged with a "disease" classification, and "iron capsule" may be tagged with a "medication" classification. Thus, the association between "anemia" and "iron capsule" may be tagged as a "disease-medication" association. The system may further assign additional tags or sub-tags which may further define the classifications of concepts. For instance, if "iron capsule" is tagged as a "medication," the "medication" tag may further be tagged with an additional tag that further describes the concept and/or tag (e.g., a tag of "pharmacologic substance").

To build the association database, the system may access one or more databases that may contain the information needed to automatically construct the associations. For instance, the system may access external resources (e.g., search engines or databases) that may contain and/or grant access to medical literature or research papers, such as PubMed. In such scenarios, the system may use machine learning algorithms (which may include NLP based algorithms) to detect the frequency at which certain concepts appear within a given resource or document (e.g., within the same sentence, paragraph, or document). For instance, the concepts chronic kidney disease (a medical condition), staphylococci (a bacterial infection to which CKD patients are susceptible), and vancomycin (an antibiotic) appear within the same reference, the system may generate associations between the three concepts. Furthermore, the system may track the number of times such concepts occur together across the various resources within the databases. To illustrate, the above three concepts may be described in multiple different research papers. Based on the frequency at which the concepts appear together, the system may strengthen the weights of the associations between the concepts. In some embodiments, the system may set a minimum weight threshold that must be met by a generated association in order for the association to be reported in the query output. To illustrate, concepts that appear together only in a single research paper may have relatively low association weight values such that the minimum weight threshold is not met. In some embodiments, each of the concepts and/or associations between each concept may be associated with a concept unique identifier ("CUP").

In some embodiments, rather than performing an absolute count of the number of times certain concepts appear together, the system may apply a normalization process by comparing the number of times that concepts appear together against the number of times that the concepts do not appear together. In this way, the system may account for the reality that some concepts (e.g., diabetes) may appear more frequently in the databases than other, rarer conditions.

In some embodiments, the system may further access one or more databases that may relate to medical definitions and/or coding databases, such as Unified Medical Language System ("UMLS") databases, to generate associations between not only the source concepts and target concepts, but concepts that may lie in the same hierarchical structure as the source concepts and target concepts. For instance, the source concept "anemia" may be associated with one or more general, upper level concepts (or "ancestors"), which may include for instance "diseases of the blood," and/or one or more specific, lower level concepts (or "descendants"), which may include "pernicious anemia" (a subtype of anemia). To generate hierarchical associations, the system may pull data from a hierarchical database (e.g., a database containing ICD-10 codes) that may contain a set of associations between members within a hierarchy. Furthermore, the system may pull associations from one or more medical insurance coverage databases which may contain various associations between concepts (e.g., treatments or procedures relating to a particular condition that are covered by insurance). Based on establishing the hierarchy of concepts, the system may in some embodiments further generate associations between vertical ancestors and/or descendants of the original source concept and other target concepts associated with the source concept (e.g., "pernicious anemia" may be associated with "iron capsule" even if the system does not find these two concepts together within the medical literature database). Conversely, if a descendant of the source concept is found to have an association with a target concept (e.g., "pernicious anemia" is associated with "hemoglobin level" based on an analysis of the medical databases), an association may also be created between the original source concept and a target concept (e.g., between "anemia" and "hemoglobin level").

In some embodiments, the type of database from which the association is generated may influence the weighting between concepts. For instance, the weighting between concepts (e.g., a treatment and a condition) may be relatively higher if the association were generated based on pulling from a claims coverage database as opposed to based on NLP-based analysis of research papers. Similarly, user-inputted manual entries into the association database may be assigned a relatively higher weight by the system or be assigned a manually configurable weight.

Furthermore, the system may progressively adjust the weights of associations between vertical concepts within the same hierarchy. In this regard, the further away a target concept is from a source concept within the same hierarchy, the lower the weights may be of the association between said target concept and source concept. To illustrate, an ICD-10 database may include a source concept "sickle-cell thalassemia," which may be part of a hierarchy that falls under "sickle-cell disorders," which falls under "hemolytic anemias," which falls under "diseases of the blood." The system may determine that the ancestor "diseases of the blood" is too remote or abstract to be relevant to "sickle-cell thalassemia." Accordingly, the system may block the association between "sickle-cell thalassemia" and "diseases of the blood" or delete such an association if it has been formed.

Once the associations have been generated, the system may respond to search queries for concepts from the user. For instance, the user may be a physician who is submitting a search query for entries within a patient's electronic data record (e.g., EMR) that relate to the source concept of "anemia." In this regard, the search query may comprise the source concept (which may be designated by a medical code such as an ICD-10 code) and a patient identifier or other type of identifier associated with the electronic data record. Based on the source concept inputted by the user, the system may translate the medical code corresponding to the source concept to the CUI to which the medical code is mapped. The system may then retrieve one or more associations and/or target concepts relating to the source concept, which of which may in turn be associated with their own CUI's. The CUI's may then be mapped back to their medical codes, which may then be used by the system to retrieve the relevant data entries associated with said medical codes. Once the data entries along with association weights have been retrieved, the target concepts as well as the association weights may be presented to the user.

The system as described herein confers a number of technological advantages over conventional database systems. For instance, by using machine learning processes, the system may automatically generate the associations necessary to provide the optimal context-relevant view of a concept in response to a search query. Furthermore, by automatically filtering relevant nodes and/or associations according to their weight values, the system reduces the possibility of missing critical information within the electronic data record due to the size of the data record (e.g., the vast number of entries stored therein).

Turning now to the figures, FIG. 1 illustrates an operating environment 100 for the intelligent association generation system, in accordance with one embodiment of the present disclosure. In particular, FIG. 1 illustrates a node association database system 106 that is operatively coupled, via a network, to a user computing system 103 and an external database system 104. In such a configuration, the node association database system 106 may, in some embodiments, transmit information to and/or receive information from the user computing system 103 and/or the external database system 104. It should be understood that FIG. 1 illustrates only an exemplary embodiment of the operating environment 100, and it will be appreciated that the system may comprise a fewer or greater number of computing systems than what is depicted in FIG. 1. For instance, one or more functions of the systems, devices, or servers as depicted in FIG. 1 may be combined into a single system, device, or server, or alternatively may be distributed across multiple computing systems, devices, or servers. Furthermore, a single system, device, or server as depicted in FIG. 1 may represent multiple systems, devices, or servers.

The network may be a system specific distributive network receiving and distributing specific network feeds and identifying specific network associated triggers. The network includes one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the node association database system 106 may be a computing system that performs the intelligent generation of node associations, database lookup, and search query processing functions as described elsewhere herein. Accordingly, the node association database system 106 may comprise a communication device 152, a processing device 154, and a memory device 156. The node association database system 106 may be a device such as a networked server, desktop computer, terminal, or any other type of computing system as described herein. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 may be operatively coupled to the communication device 152 and the memory device 156 such that the processing device 154 uses the communication device 152 to communicate with the network and other devices on the network, such as, but not limited to the user computing system 103 and the external database system 104. In this regard, the communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a node association application 162, which may comprise computer-executable program code which may instruct the processing device 154 to perform certain logic, data processing, and data storing functions of the application to accomplish the entity's objectives. For instance, the node association application 162 may, when executed by the processing device 154, cause the processing device 154 to receive search queries from and transmit outputs to the user computing system 103, pull data from the external database system 104, generate and store associations, compute association weights, and the like.

In some embodiments, the memory device 156 includes data storage 158 for storing data related to the system environment. In this regard, the data storage 158 may comprise an association database 164, which may include a database of node associations that have been generated by the node association database system 106. In some embodiments, the association database 164 may further comprise the computed weights of the associations between the various nodes. It should be understood that in alternative embodiments, the association database 164 may be hosted on a separate computing system (e.g., another database server) instead of being hosted on the node association database system 106.

As further illustrated in FIG. 1, the operating environment 100 may further comprise a user computing system 103 in operative communication with the node association database system 106. The user computing system 103 may be a computing system that is operated by a user 101, such as a physician or other medical personnel. Accordingly, the user computing system 103 may be a device such as a desktop computer, laptop, IoT device, smartphone, tablet, single-board computer, or the like. The user computing system 103 may comprise a user interface configured to allow the user computing system 103 to interact with the user 101, where the user interface may comprise one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The user computing system 103 may comprise a processing device 134 operatively coupled to a communication device 132 and a memory device 136 having data storage 138 and computer readable instructions 140 stored thereon. The computer readable instructions 140 may comprise a user application 144 which may receive inputs from the user 101 and produce outputs to the user 101. In particular, the user application 144 may be used by the user 101 to submit search queries to and receive search output/results from the node association database system 106. Accordingly, in some embodiments, the user application 144 may be an application provided by the entity with a graphical interface configured to receive search queries and display output results to the user 101. In other embodiments, the user application 144 may be a third party application such as a web browser that is configured to access a web server or application hosted on the node association database system 106.

The operating environment 100 may further comprise an external database system 104. The external database system 104 may be a third party computing system that may host data from which the node association database system 106 may use to construct associations and hierarchies, retrieve medical codes, and the like. Accordingly, the external database system 104 may comprise a processing device 174 operatively coupled to a communication device 172 and a memory device 176 comprising data storage 178 and computer readable instructions 180. The data storage 178 may have external data 182 stored therein, where the external data 182 may be retrieved and processed by the node association database system 106 to drive the processes as described herein.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a diagram showing an exemplary association between nodes, in accordance with some embodiments of the present disclosure. As seen in FIG. 2, a source node 201, which may represent a source concept such as "anemia," may be associated with a first target node 202 and a second target node 203. The first target node 202 may represent, for instance, the concept of "iron capsule," whereas the second target node 203 may represent "hemoglobin level." The associations between the source node 201 and the first target node 202 and second target node 203 (represented by solid lines) may be horizontal or lateral associations created by mining medical databases and/or from a patient's EMR. The source node 201 may further be associated with one or more related nodes (e.g., ancestors or descendants). As seen in FIG. 2, the source node 201 is associated with one or more first level nodes 211, 212, 213 (as denoted by the directional arrows), which may be descendants of the source node 201. In turn, one or more of the first level nodes 211, 212, 213 may be associated with a second level node 212. In such a configuration, the second level node 212 is further considered to be associated with the source node 201 (e.g., as a related node to the source node 201).

Each of the associations between the various nodes in FIG. 2 may be weighted by the system based on various factors. For instance, the weight value between the source node 201 and the first target node 202 may be increased if the system determines that the concepts represented by the source node 201 and the first target node 202 frequently appear together (e.g., within the same sentence) within one or more entries (e.g., research papers) within a medical database.

In some embodiments, the frequency of the number of associations from a particular set of concepts to a specific node may be normalized by dividing said frequency by the total number of associations within the set of concepts, thereby producing a normalized frequency. Subsequently, an association weight for each node may be calculated as a sum of the normalized frequency associations of the node, its descendants, and ancestors. Furthermore, associations may further be assigned high values depending on the reliability of the source data from which the association has been mined. For example, an association generated based on medical insurance data may be considered to be trustworthy or reliable, which in turn will cause the system to increase the weight of the association between such concepts.

FIG. 3 illustrates a process flow 300 for generating a node associations database using machine learning, in accordance with some embodiments of the present disclosure. The process 300 begins at block 301, where the system retrieves, from one or more external databases, node data associated with one or more nodes (or concept data associated with one or more concepts). The one or more external databases may comprise one or more hierarchical databases that may contain hierarchical data on the one or more concepts (e.g., a UMLS database storing medical concepts, which may include diseases, procedures, medications, tests, and the like). In some embodiments, the one or more external database may further comprise one or more reference databases that may include data entries comprising medical research papers and/or one or more claims coverage databases that may include data relating to medical procedure, test, or treatment coverage information.

The process continues to block 302, where the system identifies, using a machine learning algorithm, the one or more nodes within the node data. In some embodiments, the machine learning algorithm may comprise an NLP-based algorithm that may parse natural language to identify concepts and generate association between such concepts. For instance, the system may detect that the phrase "chronic kidney disease" appears in the same document as the word "staphylococci." Each identified concept may be assigned a concept unique identifier ("CUI") that uniquely identifies the concept. In some embodiments, upon using the machine learning algorithms to identify concepts, match the one or more concepts to a medical code associated with the one or more concepts. For instance, the one or more CUI's may be mapped to a particular ICD-10 code as read from a UMLS database.

The process continues to block 303, where the system generates one or more node associations between the one or more nodes. In particular, the system may generate the associations between the concepts in a number of ways. For instance, the associations may be generated by computing a normalized frequency of the instances in which two concepts appear within the same data entry of a reference database (e.g., the number of times that certain concepts are disclosed within a research paper). In some embodiments, the associations may be generated based on the data with hierarchical databases. For instance, the vertical associations between a source concept and lower level and higher level related concepts (e.g., descendants and ancestors) may be generated based on the structures found with a UMLS database. In this way, the system may be able to traverse hierarchical structures of concepts to match such concepts to particular data records within the electronic data record (e.g., a patient's EMR).

Each of the associations generated may be assigned a weight value that may in turn be calculated in a number of different ways. For example, associations with higher frequencies may be assigned greater weight values by the system. In other embodiments, the weight value may be increased based on the source from which the association was built. For instance, manually generated associations and/or associations built from certain types of data sources (e.g., hierarchical associations generated from hierarchical databases, associations built from coverage databases, or the like) may be assigned a relatively higher weight value. In some embodiments, the system may discard certain associations that may have a weight value that falls below a predetermined threshold.

The process concludes at block 304, where the system stores the one or more node associations within a node associations database. In this regard, one or more concepts along with their respective associations may be stored within the associations database, where each concept and/or association may be assigned a concept unique identifier (e.g., a CUI). Subsequently, each CUI may be in turn associated with a code or identifier corresponding to certain concepts within the electronic data record. The system may further store this mapping of CUI's to codes within the associations database for later use in responding to search queries. In some embodiments, the associations database may be a relational database (e.g., a SQL database). In other embodiments, the associations database may be a graph database that may store concepts as vertices and associations as relationships.

FIG. 4 illustrates a process flow for receiving and responding to search queries for relevant data within an electronic data record, in accordance with some embodiments of the present disclosure. The process 400 begins at block 401, where the system receives, from a user application, a search query associated with an electronic data record, wherein the search query comprises a source node and a data record identifier associated with the electronic data record. In an exemplary embodiment, a user such as a physician may submit a search query of a patient's EMR for concepts related to a condition relevant to the patient (e.g., anemia). Accordingly, the query may request information such as relevant disease conditions, medications, procedures or treatments, laboratory test results, and the like. In this regard, the source node may be a concept selected by the physician (e.g., a typed word in a text entry field, a selection from a drop down menu, or the like), whereas the data record identifier associated with the electronic data record may be a patient identifier. In some embodiments, the source node selected by the user may be associated with a source identifier code that uniquely identifies the source concept. In this regard, the source identifier code (and other identifier codes described herein) may be a defined medical code (e.g., an ICD-10 code). In some embodiments, the system may receive the search query from the user application through an application programming interface ("API") layer.

The process continues to block 402, where the system retrieves one or more source unique identifiers associated with a source identifier code. In this regard, the system may access a mapping database containing a mapping of concept codes to unique identifiers. The unique identifiers may be concept unique identifiers that are associated with the source concept code (or "source concept unique identifiers"), where the concept unique identifiers are stored within the associations database. It should be understood that though a single concept code may be associated with a single concept unique identifier, it is within the scope of the disclosure for a concept code to be associated with multiple concept unique identifiers (e.g., related concepts within the source node's hierarchy). Conversely, a concept unique identifier may be associated with multiple concept codes.

The process continues to block 403, where the system identifies, using the node associations database, one or more target unique identifiers associated with the one or more source unique identifiers. The one or more target unique identifiers, like the source unique identifiers, may be stored within the associations database. Accordingly, the system may retrieve all target unique identifiers that are linked through associations with the one or more source unique identifiers.

The process continues to block 404, where the system, based on the one or more target unique identifiers, identifies one or more target identifier codes. At this step, the system may once again access the mapping database to retrieve the target concept codes that are mapped to the target unique identifiers. Like the source concept codes, the target concept codes may be mapped to target unique identifiers in a one-to-one, one-to-many, or many-to-one mapping.

The process continues to block 405, where the system computes weights of one or more associations corresponding with the source identifier code. In some embodiments, the system may compute the maximum weight over the source unique identifiers. If multiple target unique identifiers are mapped to a target concept code, the system may further compute the maximum weight over the target unique identifiers. On the other hand, if a single target unique identifier is mapped to multiple target concept codes, the same weight may be assigned to all target concept codes.

The process continues to block 406, where the system, based on the source identifier code and the one or more target identifier codes, retrieves a subset of the electronic data record. At this step, the system may return the source concept codes, the target concept codes, and the weights to the API, after which the API may retrieve the relevant concepts from the electronic data record (e.g., the patient's EMR). In some embodiments, the relevant concepts may be Fast Healthcare Interoperability Resources ("FHIR") objects. In this regard, the FHIR objects may be passed through a filter based on the associated codes.

The process concludes at block 407, where the system presents, on a display of a user computing system, the subset of the electronic data record and the weights of the one or more associations. In some embodiments, an FHIR extension attribute may be created for the FHIR objects. The FHIR objects and weights may be passed from the API to the user application to be presented on a graphical interface of the user application. In this regard, the target concepts (e.g., laboratory test results, relevant medications, and the like) may be listed and/or ranked according to the strength of the association weights between the target concepts and the inputted source concept. In this way, the system provides an efficient and comprehensive way to provide context-relevant views of an electronic data record.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating machine learning-based associations for electronic data records, the system comprising:
   a processing device; and
   a non-transitory storage device containing instructions when executed by the processing device, causes the processing device to:
      retrieve node data associated with one or more nodes from one or more external databases, wherein the one or more external databases comprises a medical coding database;
      identify, using a machine learning algorithm, the one or more nodes within the node data;
      generate one or more node associations between the one or more nodes within the node data;
      store the one or more nodes and the one or more node associations in a node associations database, wherein each of the one or more nodes is assigned a concept unique identifier;
      receive, from a user application of a user computing device, a search query associated with an electronic data record, wherein the electronic data record is an electronic health record ("EHR") or an electronic medical record ("EMR"), wherein the search query comprises a source node, wherein the source node is associated with a source identifier code, wherein the node associations database comprises mappings of medical concepts to medical codes, wherein the source node comprises a medical concept, wherein the source identifier code is a medical code associated with the source node;

identify, using the node associations database, a source unique identifier associated with the source identifier code;

identify one or more target unique identifiers associated with the source unique identifier, wherein each of the one or more target unique identifiers is associated with one or more target nodes, wherein each of the one or more target nodes is associated with one or more target identifier codes, wherein the one or more target identifier codes each comprise a medical code associated with at least one target node of the one or more target nodes;

based on the source identifier code and the one or more target identifier codes, retrieve at least a subset of the electronic data record; and present the at least a subset of the electronic data record on a display device of the user computing device, the at least a subset of the electronic data record comprising the one or more target nodes related to the source node and one or more data entries within the electronic data record associated with the one or more target nodes.

2. The system according to claim 1, wherein generating the one or more node associations comprises:
for each node pair within the node data, computing a normalized frequency of detected instances of the node pair within a data entry of a reference database; and
assigning a weight value for an association between the node pair based on the normalized frequency.

3. The system according to claim 2, wherein assigning the weight value comprises increasing the weight value based on detecting a higher normalized frequency of the node pair.

4. The system according to claim 2, wherein generating the one or more node associations comprises discarding the association between the node pair based on detecting that the weight value has dropped below a predetermined threshold.

5. The system according to claim 1, wherein generating the one or more node associations comprises:
accessing a hierarchical database associated with the source node; and
generating associations between the source node and one or more nodes within a hierarchical structure associated with the source node.

6. The system according to claim 1, wherein presenting the at least a subset of the electronic data comprises presenting a ranked list of the one or more target nodes related to the source node, wherein the one or more target nodes are ranked according to association weights between the one or more target nodes and the source node.

7. The system according to claim 1, wherein the node associations database is a relational database.

8. The system according to claim 1, wherein the node associations database is a graph database, wherein the source node and the one or more target nodes are stored as vertices, and the one or more associations are stored as edges.

9. A computer program product for generating machine learning-based associations for electronic data records, the computer program product comprising a non-transitory computer-readable medium comprising code causing an apparatus to:

retrieve node data associated with one or more nodes from one or more external databases, wherein the one or more external databases comprises a medical coding database;

identify, using a machine learning algorithm, the one or more nodes within the node data;

generate one or more node associations between the one or more nodes within the node data;

store the one or more nodes and the one or more node associations in a node associations database, wherein each of the one or more nodes is assigned a concept unique identifier;

receive, from a user application of a user computing device, a search query associated with an electronic data record, wherein the electronic data record is an electronic health record ("EHR") or an electronic medical record ("EMR"), wherein the search query comprises a source node, wherein the source node is associated with a source identifier code, wherein the node associations database comprises mappings of medical concepts to medical codes, wherein the source node comprises a medical concept, wherein the source identifier code is a medical code associated with the source node;

identify, using the node associations database, a source unique identifier associated with the source identifier code;

identify one or more target unique identifiers associated with the source unique identifier, wherein each of the one or more target unique identifiers is associated with one or more target nodes, wherein each of the one or more target nodes is associated with one or more target identifier codes, wherein the one or more target identifier codes each comprise a medical code associated with at least one target node of the one or more target nodes;

based on the source identifier code and the one or more target identifier codes, retrieve at least a subset of the electronic data record; and present the at least a subset of the electronic data record on a display device of the user computing device, the at least a subset of the electronic data record comprising the one or more target nodes related to the source node and one or more data entries within the electronic data record associated with the one or more target nodes.

10. The computer program product of claim 9, wherein generating the one or more node associations comprises:
for each node pair within the node data, computing a normalized frequency of detected instances of the node pair within a data entry of a reference database; and
assigning a weight value for an association between the node pair based on the normalized frequency.

11. The computer program product of claim 10, wherein assigning the weight value comprises increasing the weight value based on detecting a higher normalized frequency of the node pair.

12. The computer program product of claim 10, wherein generating the one or more node associations comprises discarding the association between the node pair based on detecting that the weight value has dropped below a predetermined threshold.

13. The computer program product of claim 9, wherein generating the one or more node associations comprises:
accessing a hierarchical database associated with the source node; and generating associations between the source node and one or more nodes within a hierarchical structure associated with the source node.

14. The computer program product of claim 9, wherein presenting the at least a subset of the electronic data comprises presenting a ranked list of the one or more target nodes related to the source node, wherein the one or more target nodes are ranked according to association weights between the one or more target nodes and the source node.

15. A computer-implemented method for generating machine learning-based associations for electronic data records, the computer-implemented method comprising:
retrieving node data associated with one or more nodes from one or more external databases, wherein the one or more external databases comprises a medical coding database;
identifying, using a machine learning algorithm, the one or more nodes within the node data;
generating one or more node associations between the one or more nodes within the node data;
storing the one or more nodes and the one or more node associations in a node associations database, wherein each of the one or more nodes is assigned a concept unique identifier;
receiving, from a user application of a user computing device, a search query associated with an electronic data record, wherein the electronic data record is an electronic health record ("EHR") or an electronic medical record ("EMR"), wherein the search query comprises a source node, wherein the source node is associated with a source identifier code, wherein the node associations database comprises mappings of medical concepts to medical codes, wherein the source node comprises a medical concept, wherein the source identifier code is a medical code associated with the source node;
identifying, using the node associations database, a source unique identifier associated with the source identifier code;
identifying one or more target unique identifiers associated with the source unique identifier, wherein each of the one or more target unique identifiers is associated with one or more target nodes, wherein each of the one or more target nodes is associated with one or more target identifier codes, wherein the one or more target identifier codes each comprise a medical code associated with at least one target node of the one or more target nodes;
based on the source identifier code and the one or more target identifier codes, retrieving at least a subset of the electronic data record; and
presenting the at least a subset of the electronic data record on a display device of the user computing device, the at least a subset of the electronic data record comprising the one or more target nodes related to the source node and one or more data entries within the electronic data record associated with the one or more target nodes.

16. The computer-implemented method of claim 15, wherein generating the one or more node associations comprises:
for each node pair within the node data, computing a normalized frequency of detected instances of the node pair within a data entry of a reference database; and
assigning a weight value for an association between the node pair based on the normalized frequency.

17. The computer-implemented method of claim 16, wherein assigning the weight value comprises increasing the weight value based on detecting a higher normalized frequency of the node pair.

18. The computer-implemented method of claim 16, wherein generating the one or more node associations comprises discarding the association between the node pair based on detecting that the weight value has dropped below a predetermined threshold.

19. The computer-implemented method of claim 15, wherein generating the one or more node associations comprises:
accessing a hierarchical database associated with the source node; and
generating associations between the source node and one or more nodes within a hierarchical structure associated with the source node.

20. The computer-implemented method of claim 15, wherein presenting the at least a subset of the electronic data comprises presenting a ranked list of the one or more target nodes related to the source node, wherein the one or more target nodes are ranked according to association weights between the one or more target nodes and the source node.

* * * * *